(12) United States Patent
Ide

(10) Patent No.: US 6,965,654 B1
(45) Date of Patent: Nov. 15, 2005

(54) FREQUENCY OFFSET QUANTITY DETECTING APPARATUS

(75) Inventor: Minako Ide, Yokohama (JP)

(73) Assignee: Matsushita Electric Industrial CO, Ltd., Osaka (JP)

(*) Notice: Subject to any disclaimer, the term of this patent is extended or adjusted under 35 U.S.C. 154(b) by 906 days.

(21) Appl. No.: 09/787,795

(22) PCT Filed: Jul. 10, 2000

(86) PCT No.: PCT/JP00/04569

§ 371 (c)(1),
(2), (4) Date: Mar. 23, 2001

(87) PCT Pub. No.: WO01/08368

PCT Pub. Date: Feb. 1, 2001

(30) Foreign Application Priority Data

Jul. 28, 1999 (JP) .................. 11-213955

(51) Int. Cl.[7] ............................ H04L 27/06
(52) U.S. Cl. .................. 375/344; 375/330; 329/304
(58) Field of Search ............... 375/330, 344; 329/304

(56) References Cited

U.S. PATENT DOCUMENTS 5,550,506 A * 8/1996 Tsumura ................. 329/304
6,097,768 A * 8/2000 Janesch et al. ........... 375/330

FOREIGN PATENT DOCUMENTS

| GB | 0373405 A2 * | 6/1990 | ........... H04L 27/14 |
|---|---|---|---|
| JP | 6261091 | 9/1994 | |
| JP | 8213933 | 8/1996 | |
| JP | 9232917 | 9/1997 | |
| JP | 11055338 | 2/1999 | |
| WO | 9007243 | 6/1990 | |

OTHER PUBLICATIONS

PCT International Search Report dated Oct. 17, 2000.
Hiroshi Kubo, "A Multiple Open-Loop AFC for MPSK." Technical Research Report of IEICE, SANE 95-114, SAT 95-92, 1996, pp. 25-32, with English abstract.

* cited by examiner

*Primary Examiner*—Stephen Chin
*Assistant Examiner*—Sudhanshu C. Pathak
(74) *Attorney, Agent, or Firm*—Stevens, Davis, Miller & Mosher, LLP

(57) ABSTRACT

A frequency offset may be determined by detecting phase information for both a one-symbol difference and a two-symbol difference of a received known signal. Half a value representing the phase information detected for the two-symbol difference is averaged, for a particular interval, with a value representing the phase information detected for the one-symbol difference. The frequency offset is determined from the average.

16 Claims, 7 Drawing Sheets

FREQUENCY OFFSET QUANTITY DETECTING APPARATUS

TECHNICAL FIELD

The present invention relates to a frequency offset quantity detecting apparatus, and more particularly to a frequency offset quantity detecting apparatus and a frequency offset quantity detecting method thereof for the use of a communication apparatus for digital-mobile communication.

BACKGROUND ART

When radio communication is performed, the radio frequency of a transmitting end and the radio frequency of a receiving end are basically made to be the same. However, actually, a gap between them of about several ppm to several tens ppm occurs owing to the accuracy of their reference clocks. To estimate the frequency gap and correct it is called frequency offset compensation (Automatic Frequency Compensation; hereinafter abbreviated as AFC).

While analog communication was the mainstream, as the AFC, there was used a method in which the receiving end swept the frequency of its clock source in an arbitrary range to select a point having a high reception level, or the like. However, in these days when radio digital communication is the mainstream, there is used a method in which the frequency offset quantity is estimated on the basis of a digital signal obtained by the A/D conversion of a received signal demodulated to a baseband frequency band to correct the frequency gap.

Although various methods are used and examined as the method of the estimation of the frequency offset quantity, there is generally known a method in which a phase difference between a former reception data and a latter reception data is obtained to remove the difference value owing to data modulation for obtaining the frequency offset quantity.

In this case, because the initial pulling into synchronism takes time in case of the use of known signals, which are limited in number, there is proposed a method for detecting the frequency offset quantity by using unknown signals (data signals) for pursuing transmission efficiency.

Hereinafter, a conventional reception apparatus will be described by reference to FIG. 1 to FIG. 3. FIG. 1 is a block diagram showing the schematic configuration of a conventional reception apparatus; FIG. 2 is a block diagram showing the schematic configuration of the AFC section of the conventional reception apparatus; and FIG. 3 is graphs showing an example of an I-Q plane for illustrating frequency offsets. Incidentally, here, the reception apparatus for the use of mobile communication in the code division multiple access (CDMA) system is examined.

In FIG. 1, an antenna 1 receives a radio signal, and a radio modulation demodulation section 2 converts the received signal from a high frequency signal to a baseband signal and outputs it to a reception procession section 3. The reception procession section 3 is composed of an A/D conversion section 4, a correlation section 5, an AFC section 6, a decoding section 7, and a error correction section 8. The A/D conversion section 4 performs the A/D conversion processing of an input received signal, and the correlation section 5 composed of, for example, a matched filer detects a demodulated signal.

The AFC section 6 detects a frequency offset quantity on the basis of the demodulated signal output from the correlation section 5, and outputs the detected frequency offset quantity to the decoding section 7 and a clock source 10. The details will be described later.

The decoding section 7 performs the phase compensation processing of the input demodulated signal on the basis of the frequency offset quantity being an output of the AFC section 6, and then performs the soft decision processing of the processed signal. The error correction section 8 performs the codec processing such as the de-interleave processing and the error correction processing of the decided signal, and outputs the processed signal to a baseband signal processing section 9. The baseband signal processing section 9 obtains the received data from the received signal after the reception processing thereof was performed by the reception processing section 3, and also obtains and transmission data to output them to a transmission processing section 11.

The clock source 10 keeps a reference clock frequency, and corrects the reference clock frequency on the basis of the frequency offset quantity that is the output of the AFC section 6, and further outputs the reference clock frequency to the radio modulation demodulation section 2, the A/D conversion section 3 and the baseband signal processing section 9. The transmission processing section 11 performs the transmission processing of a transmission baseband signal to output it to the radio modulation demodulation section 2.

Next, the configuration of the AFC section 6 and the frequency offset detection operation thereof will be described by reference to FIG. 2 and FIG. 3.

When the frequency offset is not detected by the use of known signals but is detected by the use of unknown signals (data signals), a received demodulated signal Dm is situated in any one of the first quadrant to the fourth quadrant but can not be specified. Then, if it is supposed that the noise level is sufficiently low, the demodulated signal is situated at one point in each quadrant as shown in FIG. 3A in the case where a frequency offset does not exist, but the position of the demodulated signal shifts as the passage of time as shown in FIG. 3B in the case where the frequency offset θf exists.

Because the offset quantity θf between the received symbol that delayed by one symbol and the present received symbol is always constant, the offset quantity θf can be obtained by the operation of the difference between the received symbol that delayed by one symbol and the present received symbol.

Accordingly, a delay unit 21 delays the input received demodulated signal Dm by one symbol, and a subtracter 22 subtracts the output of the delay unit 21 from the present symbol, and further a phase detector 23 converts the subtraction result ΔDm of the subtracter 22 to a phase angle to detect a phase shift θm.

However, the phase shift θm is not equivalent to the frequency offset θf and the phase shift θm also includes a phase offset θd owing to the data modulation (θm=θd+θf). Consequently, it is necessary to remove the phase offset θd.

Now, if the modulation system is supposed to be the quadrature phase shift keying (QPSK), the phase offset θd is 0°, 90°, 180° and 270°. Because these values become multiples of 360° by the multiplication by four, the frequency offset θf can be obtained by the removal of θd from θm by the following computation formula.

$$((4 \times \theta m) \bmod(360°))/4 = ((4 \times (\theta d + \theta f)) \bmod(360°))/4$$
$$= ((4\theta d + 4\theta f) \bmod(360°))/4$$
$$= 4\theta f/4$$
$$= \theta f$$

Accordingly, the frequency offset θf is obtained by the following: the phase difference θm is multiplied by four by a multiplier 24, and the remainder when the output of the multiplier 24 is divided by 360° is calculated by a modulo (mod) arithmetic unit 25, and 4 θf is multiplied by ¼ by a multiplier 26. Then, last, an averaging section 27 averages the frequency offset quantity θf in an arbitrary interval to perform the estimation and the correction of the frequency offset quantity.

As described above, because the conventional frequency offset detecting method uses not only the limited known signals but also data signals, the shortening of the initial pulling time of the AFC is possible.

However, the conventional frequency offset detecting method has a problem that the accuracy of estimation can be deteriorated because the method uses the received signal at a step before the performance of the error correction processing.

Because the bit error ratio (BER) after error correction supposed in the future cellular system using CDMA or the like is about 10-3, the BER of a signal before the error correction is equal to or more than 10-1 when it is reckoned back. When the frequency offset quantity is estimated by the use of a signal having such a BER, the deterioration of the estimation accuracy becomes large and the initial pulling can be difficult.

DISCLOSURE OF INVENTION

An object of the present invention is to provide a reception apparatus and a frequency offset quantity estimation method thereof for the improvement of frequency offset quantity estimation accuracy as well as the shortening of the initial pulling time.

A subject matter of the present invention is to aim the improvement of frequency offset quantity estimation accuracy by the use of a known signal and to aim the shortening of initial pulling time by picking up the large number of phase difference samples from the limited symbol information by the use of one-symbol phase difference information and two-symbol phase difference information together with the known signal.

BEST MODE FOR CARRYING OUT THE INVENTION

Hereinafter, embodiments of the present invention will be described in detail by reference to the drawings.

Embodiment 1

The reception apparatus according to the embodiment 1 detects a frequency offset quantity by the use of the one-symbol phase difference information and the two-symbol phase difference information of a known symbol.

Figure 1:
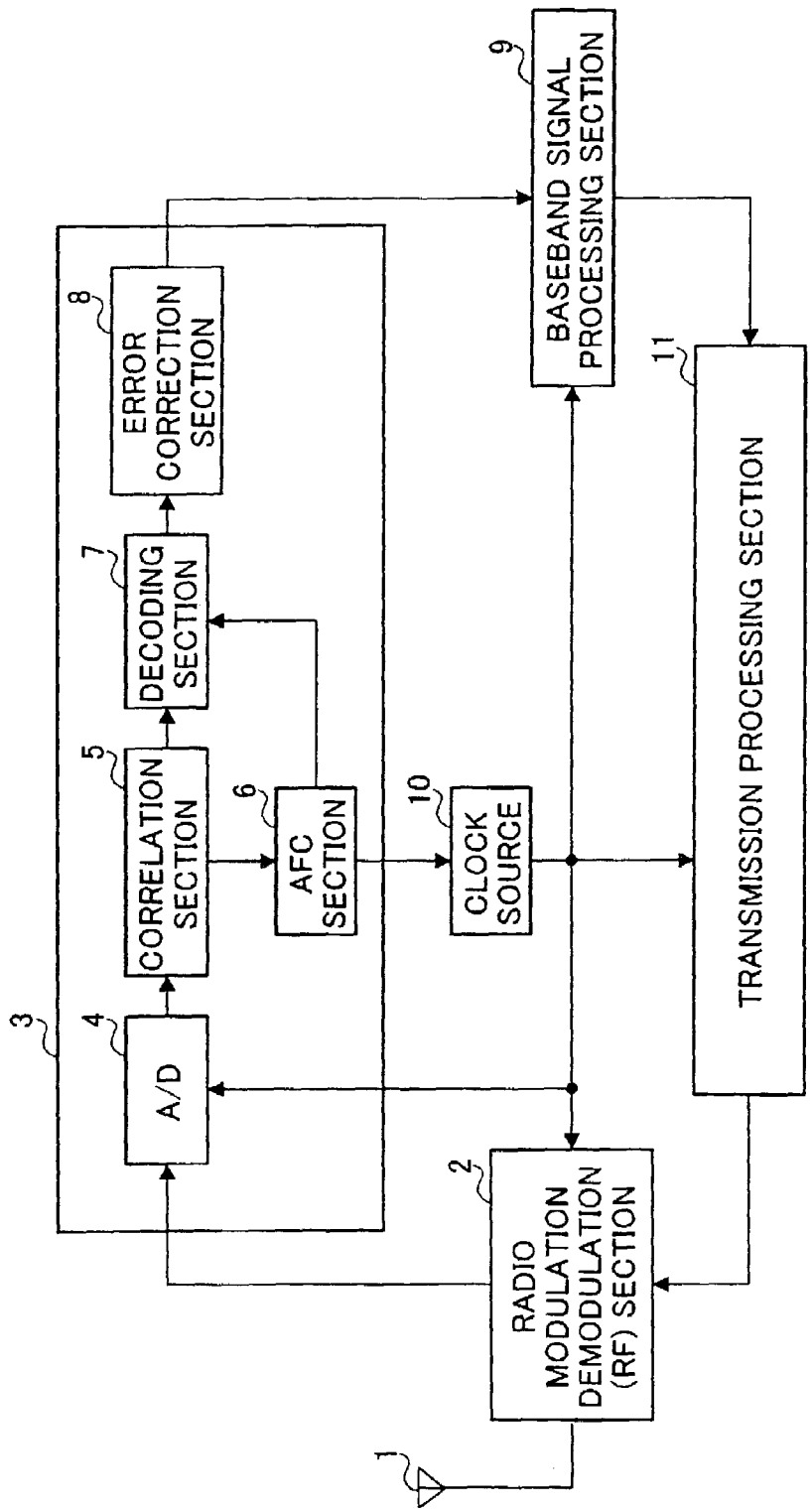
FIG. 1 is a block diagram showing the schematic configuration of a conventional reception apparatus.
Figure 2:
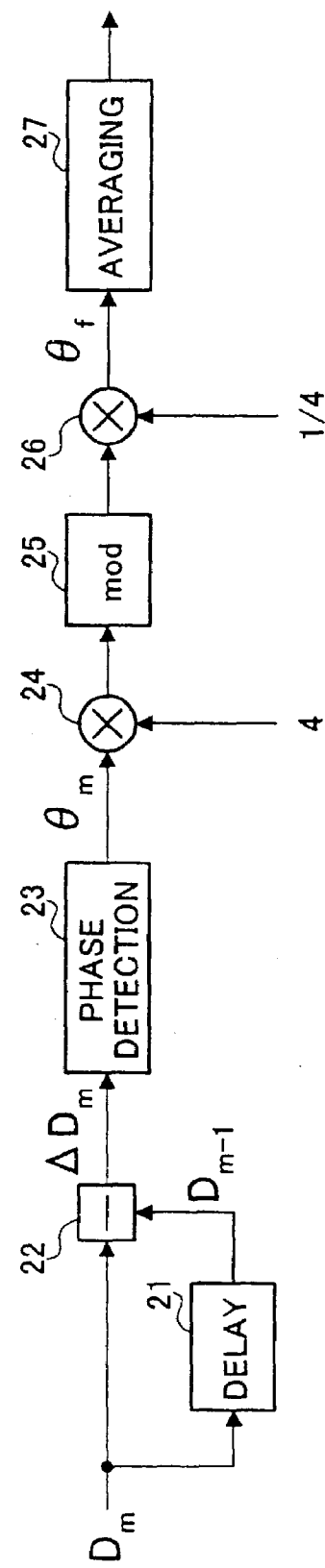
FIG. 2 is a block diagram showing the schematic configuration of the AFC section of the conventional reception apparatus.
Figure 3B:
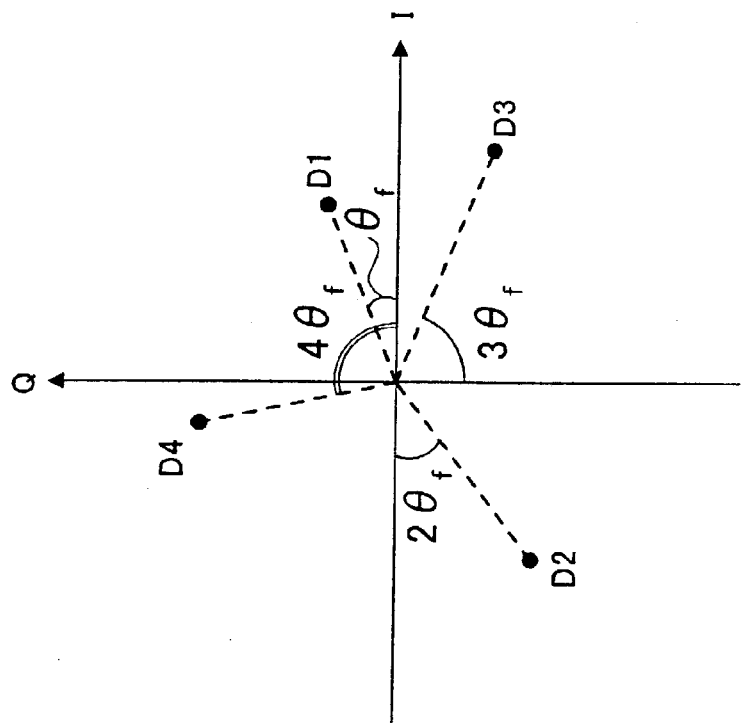
FIG. 3B is a graph showing the example of the I-Q plane for illustrating a frequency offset.
Figure 3A:
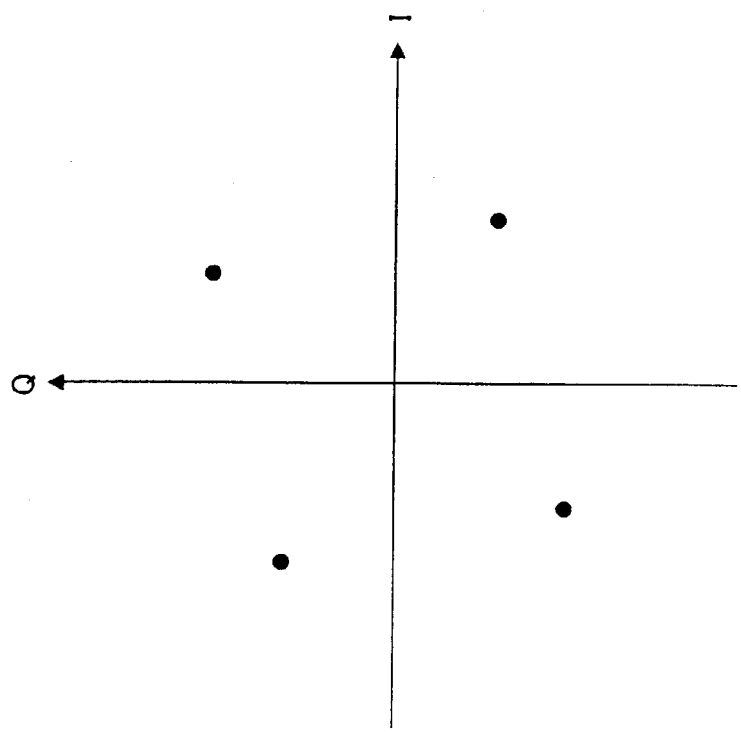
FIG. 3A is a graph showing an example of I-Q plane for illustrating a frequency offset.
Figure 4:
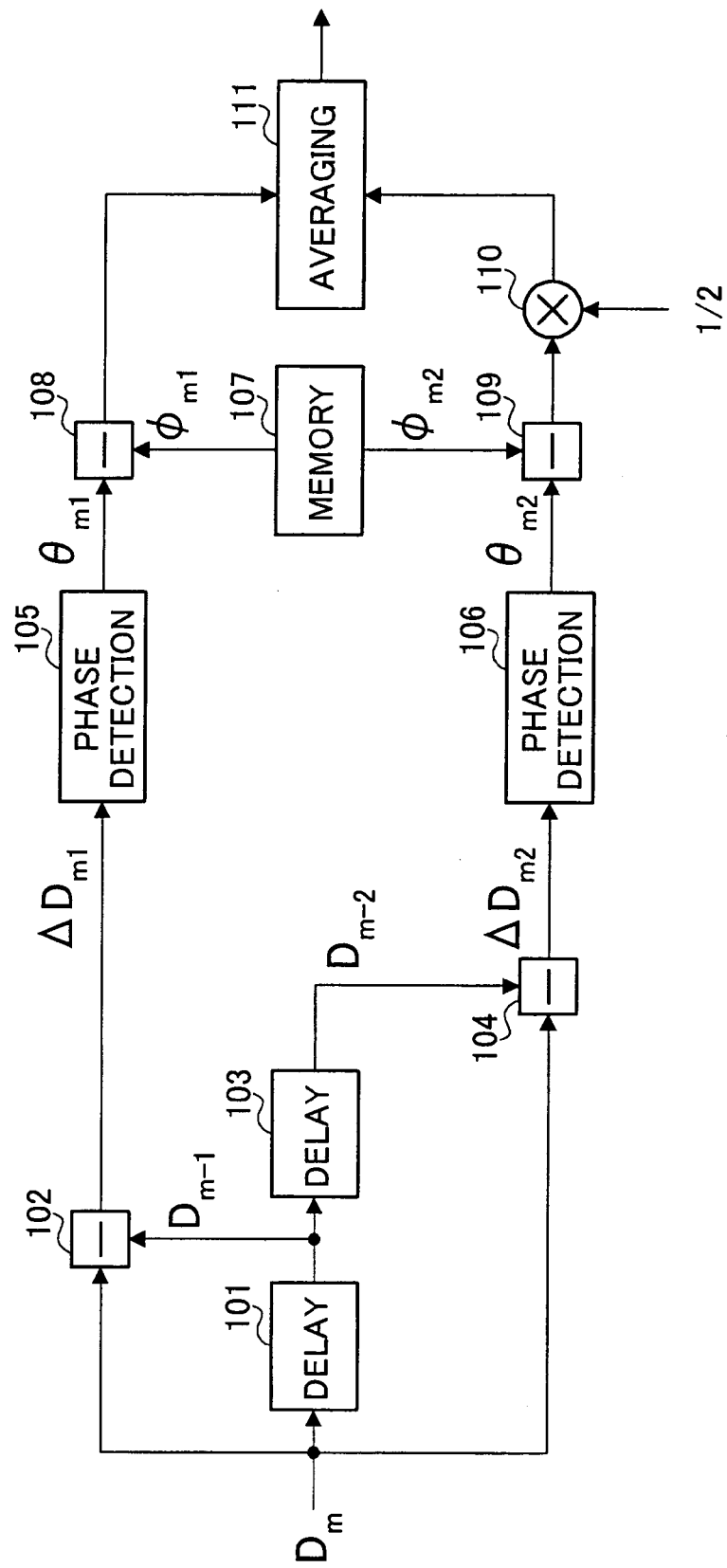
FIG. 4 is a block diagram showing the schematic configuration of the AFC section of a reception apparatus according to embodiment 1 of the present invention.

Hereinafter, the reception apparatus according to the present embodiment will be described by reference to FIG. 4. FIG. 4 is a block diagram showing the schematic configuration of the AFC section of the reception apparatus according to the embodiment 1 of the present invention.

In FIG. 4, a delay unit 101 delays a received known symbol Dm input into the AFC section by one symbol and outputs one-symbol delayed received known symbol Dm-1, and a subtracter 102 performs the subtraction processing of the one-symbol delayed received known symbol Dm-1 from the received symbol Dm to output the subtraction result ΔDm1.

A delay unit 103 delays the input one-symbol delayed received known symbol Dm-1 by one symbol to output a two-symbol delayed received known symbol Dm-2, and a subtracter 104 performs the subtraction processing of the two-symbol delayed received known symbol Dm-2 from the received symbol Dm to output the subtraction result ΔDm2.

A phase detecting section 105 converts the subtraction result ΔDm1 to a phase angle and detects a phase shift θm1, and a phase detecting section 106 converts the subtraction result ΔDm2 to a phase angle and detects a phase shift θm2.

Here, the phase shifts θm1, θm2 are not equivalent to the frequency offset θf, but the phase shifts θm1, θm2 severally include a phase offset owing to the data modulation of the reception signal, too. But, if the modulation system is known, the phase offset owing to the data modulation of a known signal is known. Accordingly, a memory 107 keeps phase offsets φm1, φm2 owing to the data modulation of known symbols beforehand.

A subtracter 108 performs the subtraction processing of the phase offset φm1 from the phase shift θm1, and a subtracter 109 performs the subtraction processing of the phase offset φm2 from the phase shift θm2. A multiplier 110 multiplies the output of the subtracter 109, which is the frequency offset quantity for two symbols, by ½ to adjust the output to be for one symbol.

An averaging section 111 averages the output of the subtracter 108 and the output of the multiplier 110 for an arbitrary interval, and outputs the averaged value as an estimated frequency offset quantity.

Next, the operation of the apparatus having the aforesaid configuration will be described.

The received symbol Dm is delayed by one symbol by the delay unit 101, and the subtraction processing of the one-symbol delayed received known symbol Dm-1 from the received symbol Dm is performed by the subtracter 102.

The one-symbol delayed received known symbol Dm-1 is delayed by one symbol by the delay unit 103, and the subtraction processing of the two-symbol delayed received known symbol Dm-2 from the received symbol Dm is performed by the subtracter 104.

The calculated subtraction results ΔDm1, ΔDm2 are converted to the phase shifts θm1, θm2 by the phase detection sections 105, 106, respectively, and the subtraction processing of the phase offsets φm1, φm2 from the phase shifts θm1, θm2 is performed by the subtracters 108, 109, respectively.

The averaging processing of the output of the subtracter 108 and the output of the subtracter 109 to which ½ is multiplied by the multiplier 110 is performed by the averaging section 111, and the averaged output is output as an estimated frequency offset quantity.

As described above, according to the present embodiment, the number of samples is increased not only by the use of a known signal together with the one-symbol phase difference information but also by the use of the two-symbol phase difference information. Consequently, it becomes possible to realize the improvement of the estimation accuracy of the frequency offset quantity and the shortening of the initial pulling time of the frequency offset compensation simultaneously.

Embodiment 2

The reception apparatus according to the present embodiment has a configuration similar to that of the embodiment 1, but the present embodiment beforehand converts the received known symbol to a phase rotation quantity being a complex signal.

Figure 5:
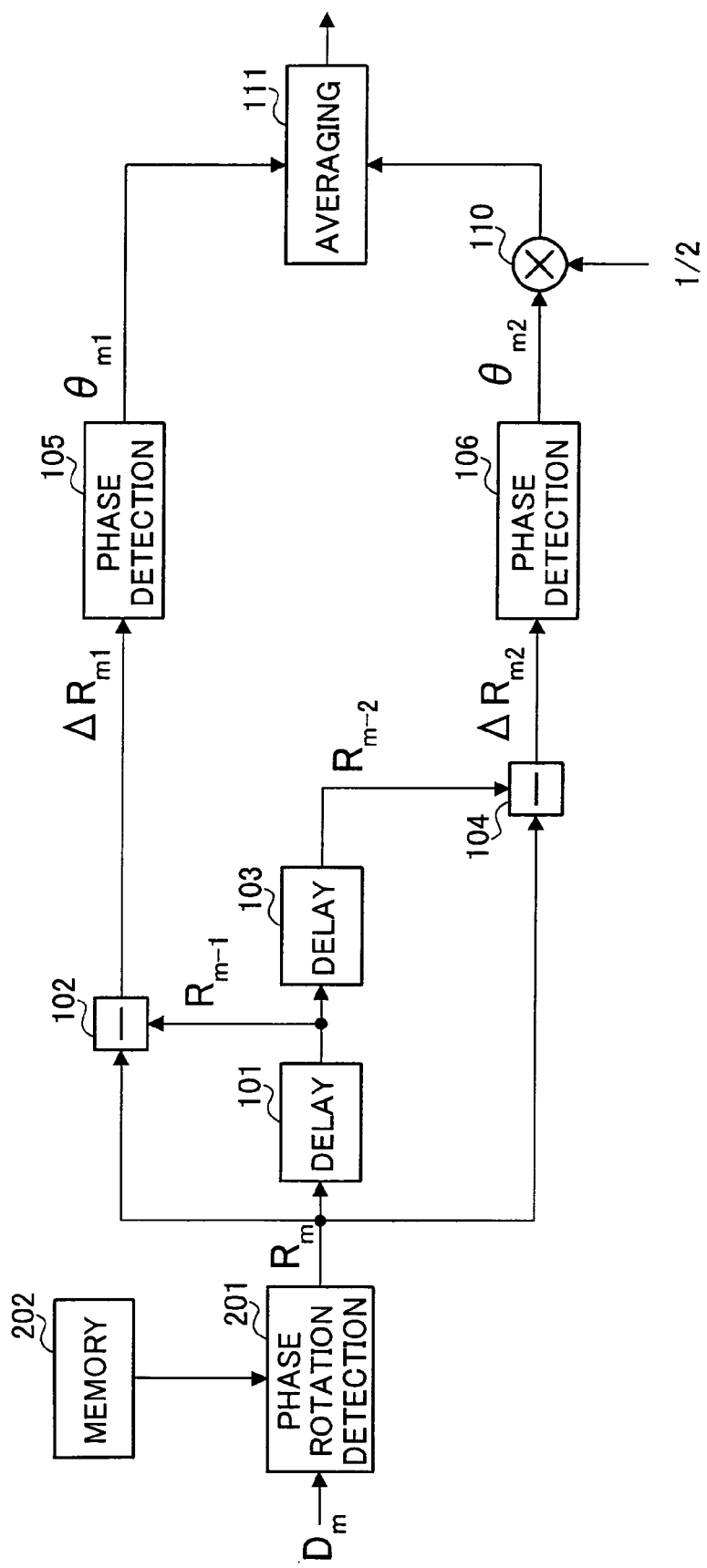
FIG. 5 is a block diagram showing the schematic configuration of the AFC section of a reception apparatus according to embodiment 2 of the present invention.

Hereinafter, the reception apparatus according to the present embodiment will be described by reference to FIG. 5. FIG. 5 is a block diagram showing the schematic configuration of the AFC section of a reception apparatus according to the embodiment 2 of the present invention. Incidentally, the constituent elements similar to those of the embodiment 1 are designated by the same reference marks as those of the embodiment 1, and their detailed descriptions are omitted.

A phase rotation detecting section 201 detects the phase rotation quantity Rm (complex signal) of a received known symbol by the use of a known signal stored in a memory 202.

After that, the processing similar to that of embodiment 1 is performed by the use of the phase rotation quantity Rm in place of the received known symbol Dm for detecting the frequency offset θf. That is, the phase rotation quantity Rm is delayed by one symbol by the delay unit 101, and the subtraction processing of the one-symbol delayed phase rotation quantity Rm-1 from the phase rotation quantity Rm is performed by the subtracter 102. The one-symbol delayed phase rotation quantity Rm-1 is delayed by one symbol by the delay unit 103, and the subtraction processing of the two-symbol delayed phase rotation quantity Rm-2 from the phase rotation quantity Rm is performed by the subtracter 104. The calculated subtraction results ΔRm1, ΔRm2 are converted to the phase shifts θm1, θm2 by the phase detecting sections 105, 106, respectively. The averaging processing of the output of the phase detecting section 105 and the output of the phase detecting section 106 to which ½ is multiplied by the multiplier 110 is performed by the averaging section, and the processed output is output as an estimated frequency offset quantity.

In the embodiment, because the processing is performed after the previous conversion of the received symbol to the phase rotation quantity being a complex signal before the delaying of the received symbol, the phase offset removing processing by the subtracters 108, 109 in FIG. 4 becomes unnecessary.

As described above, according to the present embodiment, the frequency offset detecting processing is performed after the previous conversion of the received known symbol to the phase rotation quantity being a complex signal, and thereby the process of the subtraction of the phase offset owing to data modulation from the detected phase shift can be omitted. Consequently, it becomes possible to realize the improvement of the estimation accuracy of the frequency offset quantity and the shortening of the initial pulling time of the frequency offset compensation simultaneously in a simpler configuration.

Embodiment 3

The reception apparatus according to the present embodiment has a configuration similar to that of the embodiment 2, but converts the phase rotation quantity to a phase shift angle after the averaging processing.

Figure 6:
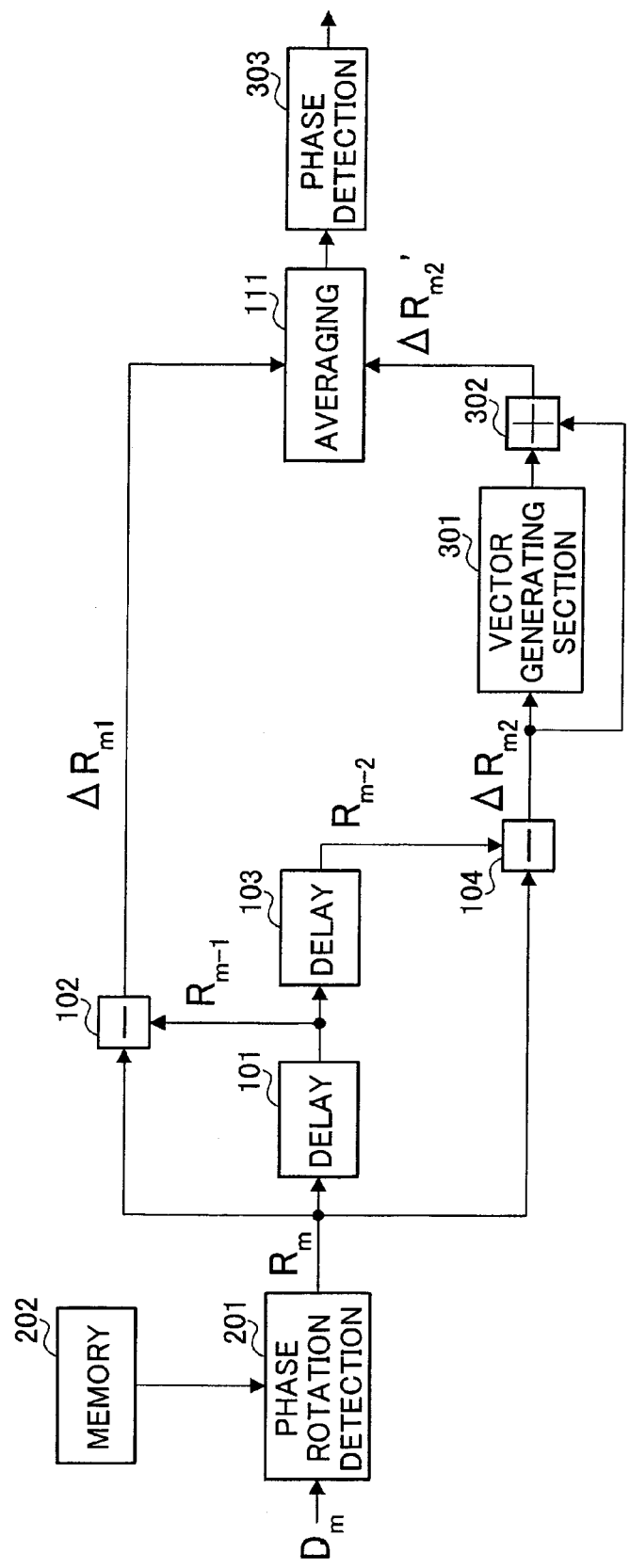
FIG. 6 is a block diagram showing the schematic configuration of the AFC section of a reception apparatus according to embodiment 3 of the present invention.
Figure 7:
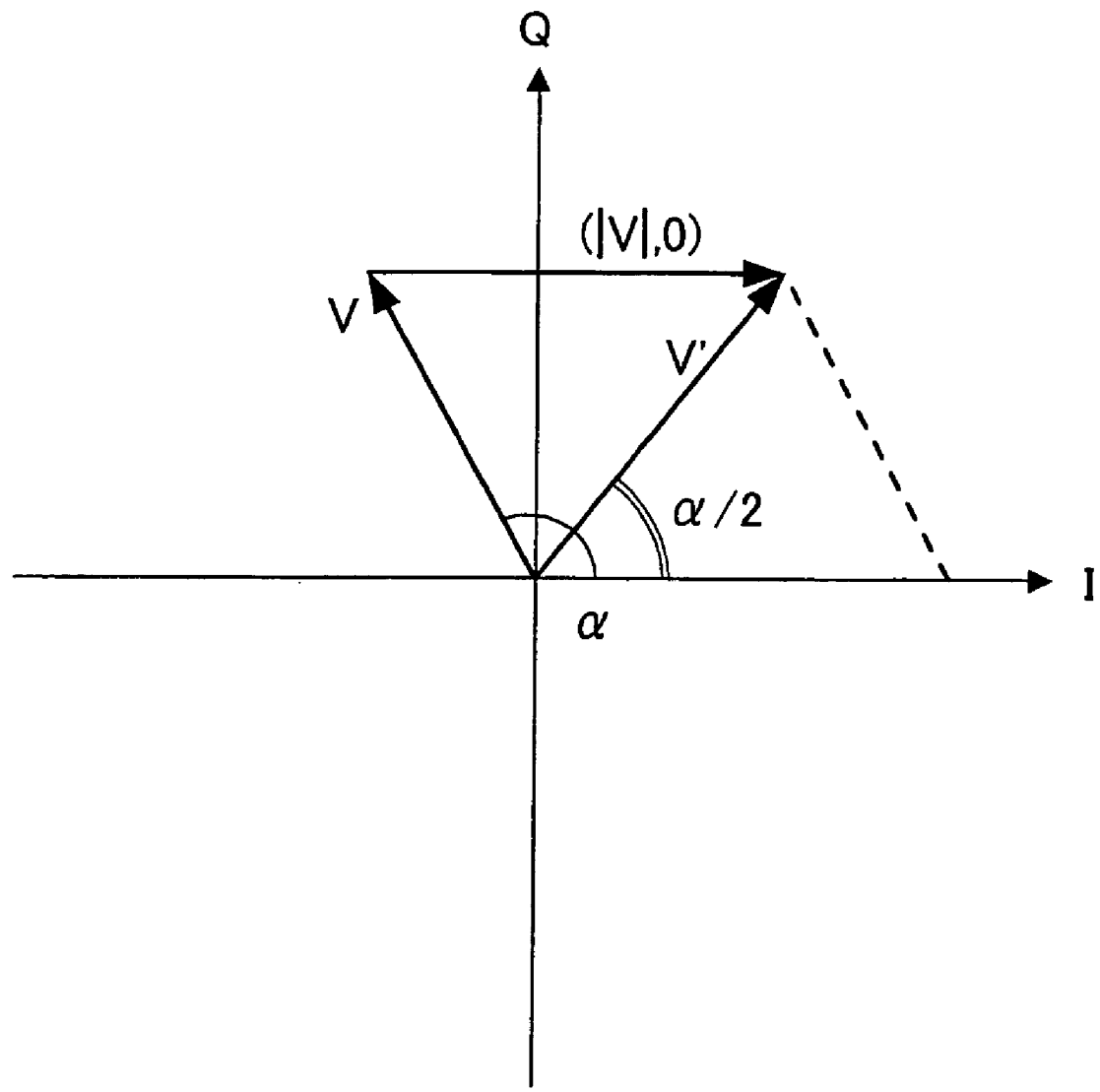
FIG. 7 is a graph for illustrating the calculation method for making the angular component of a complex signal the half thereof.

Hereinafter, the reception apparatus according to the present embodiment will be described by reference to FIG. 6 and FIG. 7. FIG. 6 is a block diagram showing the schematic configuration of the AFC section of a reception apparatus according to the embodiment 3 of the present invention, and FIG. 7 is a graph for illustrating a calculation method for making the angular component of a complex signal a half thereof. Incidentally, the constituent components similar to those of the embodiment 2 are designated by the same reference marks as those of the embodiment 2, and their detailed descriptions are omitted.

Because ΔRm2 being the output of the subtracter 104 in FIG. 6 is a phase rotation quantity for two symbols, it is necessary that the angular component of the ΔRm2 being a vector quantity is converted to a half thereof. Hereinafter, the conversion principle will be explained by the use of FIG. 7.

In FIG. 7, it is supposed that the angular component of an arbitrary complex signal V is made to be a half thereof without the use of angular information. When a rhombus two sides of which are I axis and the original complex signal V on the I-Q plane is considered, the diagonal line vector from the origin to the residual one vertex is a vector that divides the angular component of the complex signal V into two equal parts. Accordingly, by the addition of a complex signal (|V|, 0) that is parallel to the positive direction of the I axis and is sized as large as the complex signals V to the original complex signal V, a complex signal V' the angular component of which is a half of that of the original complex signal V can be obtained.

Accordingly, in FIG. 6, a vector generating section 301 generates a complex signal (|ΔRm2|, 0) that is parallel to the positive direction of the I axis and has the same largeness as that of the complex signal ΔRm2, and an adder 302 performs the addition processing of the complex signal (|ΔRm2|, 0) and the complex signal ΔRm2 to output a complex signal ΔRm2' having an angular component of a half of that of the complex signal ΔRm2 to the averaging section 111. A phase detecting section 303 detects a phase angle in the complex signal the averaging processing of which was performed to output the detected phase angle as an estimated frequency offset quantity.

As described above, according to the present embodiment, the averaging processing of two kinds of phase difference information in a state of complex signals is performed, and consequently the processes of detecting a phase angle from a complex signal can be converged to one time of performance after averaging processing. Thereby, it becomes possible to realize the improvement of the estimation accuracy of the frequency offset quantity and the shortening of the initial pulling time of the frequency offset compensation simultaneously in a simpler configuration.

Incidentally, although the communication system of the CDMA system is cited as an example in the embodiments 1–3, the present invention may be applied to any reception apparatus using the radio AFC and its communication system is indifferent.

Moreover, as the averaging method in the averaging section, there can be used arbitrary methods according to the system such as the method of moving average, and a weighted averaging method using a forgetting coefficient.

A frequency offset quantity detecting apparatus according to the present invention has a configuration comprising: a first detecting section for subtracting a previously held phase offset quantity owing to data modulation from a phase shift angle detected from one-symbol phase difference information of a received known symbol; a second detecting section for subtracting the previously held phase offset quantity owing to data modulation from a phase shift angle detected from two-symbol phase difference information of the received known symbol, and for multiplying the subtracted two-symbol phase difference information by ½; and an averaging section for averaging an output value of the first detecting section and an output value of the second detecting section for an arbitrary interval, and for outputting an averaged output value.

According to the configuration, because the number of samples is increased by the use of not only a known signal together with the one-symbol phase difference information but also two-symbol phase difference information, it becomes possible to realize the improvement of the estimation accuracy of the frequency offset quantity and the shortening of the initial pulling time of the frequency offset compensation simultaneously.

The frequency offset quantity detecting apparatus according to the present invention has a configuration comprising a converting section for converting the received known symbol to a complex signal at a previous step of the first detecting section and the second detecting section.

According to the configuration, because a step of subtracting a phase offset owing to data modulation from the detected phase shift can be omitted by performing the detection processing of the frequency offset quantity after converting the received known symbol to a phase rotation quantity being a complex signal beforehand, it becomes possible to realize the improvement of the estimation accuracy of the frequency offset quantity and the shortening of the initial pulling time of the frequency offset compensation simultaneously in a simpler configuration.

The frequency offset quantity detecting apparatus according to the present invention has a configuration wherein the second detecting section includes an operation section for multiplying a phase angle of the complex signal by ½ by vector operation.

According to the configuration, because the step of detecting phase angles from the complex signals can be converged to one time of performance after averaging processing by performing the averaging processing of two kinds of phase difference information in a state of complex signals, it becomes possible to realize the improvement of the estimation accuracy of the frequency offset quantity and the shortening of the initial pulling time of the frequency offset compensation simultaneously in a simpler configuration.

A frequency offset quantity detecting method according to the present invention comprising: a first detecting step of subtracting a previously held phase offset quantity owing to data modulation from a phase shift angle detected from one-symbol phase difference information of a received known symbol; a second detecting step of subtracting the previously held phase offset quantity owing to data modulation from a phase shift angle detected from two-symbol phase difference information of the received known symbol, and of multiplying the subtracted two-symbol phase difference information by ½; and an averaging step of averaging an output value at the first detecting step and an output value at the second detecting step for an arbitrary interval, and of outputting an averaged output value.

According to the configuration, because the number of samples is increased by the use of not only a known signal together with the one-symbol phase difference information but also two-symbol phase difference information, it becomes possible to realize the improvement of the estimation accuracy of the frequency offset quantity and the shortening of the initial pulling time of the frequency offset compensation simultaneously.

The frequency offset quantity detecting method according to the present invention converts the received known symbol to a complex signal at a previous step of the first detecting step and the second detecting step.

According to the configuration, because a step of subtracting a phase offset owing to data modulation from the detected phase shift can be omitted by performing the detection processing of the frequency offset quantity after converting the received known symbol to a phase rotation quantity being a complex signal beforehand, it becomes possible to realize the improvement of the estimation accuracy of the frequency offset quantity and the shortening of the initial pulling time of the frequency offset compensation simultaneously in a simpler configuration.

The frequency offset quantity detecting method according to the present invention multiplies a phase angle of the complex signal by ½ by vector operation in the second detecting step.

According to the method, because the step of detecting phase angles from the complex signals can be converged to one time of performance after averaging processing by performing the averaging processing of two kinds of phase difference information in a state of complex signals, it becomes possible to realize the improvement of the estimation accuracy of the frequency offset quantity and the shortening of the initial pulling time of the frequency offset compensation simultaneously in a simpler configuration.

As described above, according to the present invention, because a large number of phase difference samples are picked up from the limited symbol information by the use of a known signal and by the use of one-symbol phase difference information and two-symbol phase difference information together with the known signal, it becomes possible to realize the improvement of the estimation accuracy of the frequency offset quantity and the shortening of the initial pulling time of the frequency offset compensation simultaneously.

This application is based on the Japanese Patent Application No. HEI 11-213955 filed on Jul. 28, 1999, entire content of which is expressly incorporated by reference herein.

INDUSTRIAL APPLICABILITY

The present invention can be applied to a communication terminal apparatus and a base station apparatus in a digital radio communications system. Thereby, because a large number of phase difference samples are picked up from the limited symbol information by the use of a known signal together with the one-symbol phase difference information and the two-symbol phase difference information, it becomes possible to realize the improvement of the estimation accuracy of the frequency offset quantity and the shortening of the initial pulling time of the frequency offset compensation simultaneously.

What is claimed is:

1. A frequency offset detecting method comprising:
   detecting first phase information in a one-symbol difference of phase information for a received known signal;
   detecting second phase information in a two-symbol difference of phase information for the received known signal;
   determining half a value representing the second phase information; and
   averaging a value representing the first phase information with the determined half value.

2. The frequency offset detecting method of claim 1, wherein:
   the value representing the first phase information is a difference between a first modulation phase offset and a phase shift detected in the one-symbol difference of phase information; and
   the value representing the second phase information is a difference between a second modulation phase offset and a phase shift detected in the two-symbol difference of phase information.

3. The frequency offset detecting method of claim 1, wherein:
   the value representing the first phase information is a phase shift detected in a one-symbol difference of phase rotation; and
   the value representing the second phase information is a phase shift detected in a two-symbol difference of phase rotation.

4. The frequency offset detecting method of claim 1, wherein:
   the value representing the first phase information is a one-symbol difference of phase rotation; and
   the value representing the second phase information is a two-symbol difference of phase rotation.

5. A frequency offset detecting apparatus comprising:
   a first detector that detects first phase information in a one-symbol difference of phase information for a received known signal;
   a second detector that detects second phase information in a two-symbol difference of phase information for the received known signal;
   a determination section that determines half a value representing the second phase information; and
   an averager that averages a value representing the first phase information with the determined half value.

6. The frequency offset detecting apparatus of claim 5, wherein:
   the value representing the first phase information is a difference between a first modulation phase offset and a phase shift detected in the one-symbol difference of phase information; and
   the value representing the second phase information is a difference between a second modulation phase offset and a phase shift detected in the two-symbol difference of phase information.

7. The frequency offset detecting apparatus of claim 5, wherein:
   the value representing the first phase information is a phase shift detected in a one-symbol difference of phase rotation; and
   the value representing the second phase information is a phase shift detected in a two-symbol difference of phase rotation.

8. The frequency offset detecting apparatus of claim 5, wherein:
   the value representing the first phase information is a one-symbol difference of phase rotation; and
   the value representing the second phase information is a two-symbol difference of phase rotation.

9. A communication terminal apparatus equipped with a frequency offset detecting apparatus, the frequency offset detecting apparatus comprising:
   a first detector that detects first phase information in a one-symbol difference of phase information for a received known signal;
   a second detector that detects second phase information in a two-symbol difference of phase information for the received known signal;
   a determination section that determines half a value representing the second phase information; and
   an averager that averages a value representing the first phase information with the determined half value.

10. A base station apparatus equipped with a frequency offset detecting apparatus, the frequency offset detecting apparatus comprising:
    a first detector that detects first phase information in a one-symbol difference of phase information for a received known signal;
    a second detector that detects second phase information in a two-symbol difference of phase information for the received known signal;
    a determination section that determines half a value representing the second phase information; and
    an averager that averages a value representing the first phase information with the determined half value.

11. A frequency offset detecting apparatus comprising:
    a first subtractor that subtracts a previously held first modulation phase offset from a phase shift, detected in one-symbol phase shift difference information of a received known signal, to produce a first difference;
    a second subtractor that subtracts a previously held second modulation phase offset from a phase shift, detected in two-symbol phase shift difference information of the received known signal, to produce a second difference;
    a multiplier that multiplies the second difference by ½ to produce a multiplication product; and
    an averager that averages the first difference and the multiplication product for an interval to produce an average value.

12. A frequency offset detecting apparatus comprising:
    a phase rotation detector that detects phase rotation information of a received known signal;
    a first phase detector that detects a first phase shift in a one-symbol difference of the detected phase rotation information;

a second phase detector that detects a second phase shift in a two-symbol difference of the detected phase rotation information;

a calculator that calculates half the value of the second phase shift; and an averager that averages the first phase shift and the half value of the second phase shift for an interval to produce an average value.

13. A frequency offset detecting apparatus comprising:

a phase rotation detector that detects phase rotation information of a received known signal;

a first subtractor that provides a one-symbol difference of the detected phase rotation information;

a second subtractor that provides a two-symbol difference of the detected phase rotation information;

a calculator that calculates half the value of the two-symbol difference using a complex signal vector calculation;

an averager that averages the one-symbol difference and the half value of the two-symbol difference to produce an average value; and a phase detector that detects a phase shift from the produced average value.

14. A frequency offset detecting method comprising:

subtracting a previously held first modulation phase offset from a phase shift, detected in one-symbol phase shift difference information of a received known signal, to produce a first difference;

subtracting a previously held second modulation phase offset from a phase shift, detected in two-symbol phase shift difference information of the received known signal, to produce a second difference;

multiplying the second difference by ½ to produce a multiplication product; and averaging the first difference and the multiplication product for an interval to produce an average value.

15. A frequency offset detecting method comprising:

detecting phase rotation information of a received known signal;

detecting a first phase shift in a one-symbol difference of the detected phase rotation information;

detecting a second phase shift in a two-symbol difference of the detected phase rotation information;

calculating half the value of the second phase shift; and averaging the first phase shift and the half value of the second phase shift for an interval to produce an average value.

16. A frequency offset detecting method comprising:

detecting phase rotation information of a received known signal;

determining a one-symbol difference of the detected phase rotation information;

determining a two-symbol difference of the detected phase rotation information;

calculating half the value of the two-symbol difference using a complex signal vector calculation;

averaging the one-symbol difference and the half value of the two-symbol difference to produce an average value; and detecting a phase shift from the produced average value.

* * * * *